United States Patent
Paxton et al.

(10) Patent No.: US 6,316,767 B1
(45) Date of Patent: Nov. 13, 2001

(54) APPARATUS TO REDUCE WAIT TIME FOR SCANNER LIGHT-SOURCE WARM-UP

(75) Inventors: Dan C Paxton, Loveland; Michael L Christensen, Windsor; Eugene W Pakenham, Ft Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/398,264

(22) Filed: Sep. 17, 1999

(51) Int. Cl.[7] .................. H01J 3/14; H01J 5/16; H01J 40/14; H04N 1/04
(52) U.S. Cl. .................. 250/234; 250/214 AL; 358/475; 358/497
(58) Field of Search .................. 250/234, 205, 250/214 AL; 315/94, 149–158, 134; 358/488, 497, 475; 355/67, 69

(56) References Cited

U.S. PATENT DOCUMENTS

| | | | |
|---|---|---|---|
| 5,336,976 | * 8/1994 | Webb et al. | 315/134 |
| 5,636,040 | * 6/1997 | Tung | 358/475 |
| 5,822,077 | * 10/1998 | Sasaki et al. | 358/296 |
| 5,900,950 | * 5/1999 | Hsu | 358/497 |
| 5,907,742 | * 5/1999 | Johnson et al. | 399/51 |
| 6,163,388 | * 12/2000 | Lee et al. | 358/488 |
| 6,163,414 | * 12/2000 | Kikuchi et al. | 359/776 |
| 6,206,534 | * 3/2001 | Jenkins et al. | 362/31 |

\* cited by examiner

*Primary Examiner*—Stephone B. Allen
*Assistant Examiner*—Eric Spears

(57) ABSTRACT

An apparatus for connecting electrical power to an exposure lamp in an image scanner in response to the detection of ambient light by a light sensor located under the scanner's cover. Such an apparatus provides an apparent reduction in exposure lamp warm-up time, with associated improvement in operator productivity, while minimizing exposure lamp operational life degradation and excessive energy consumption caused by leaving the exposure lamp turned on. Once the exposure lamp is turned on, a timing circuit is used in the preferred embodiment to disconnect electrical power from the exposure lamp so that if the scanner's cover is left open or closed, the exposure lamp will not be left on for excessively long periods of time.

7 Claims, 1 Drawing Sheet

APPARATUS TO REDUCE WAIT TIME FOR SCANNER LIGHT-SOURCE WARM-UP

FIELD OF THE INVENTION

The present patent document relates generally to optical scanning devices used to translate the contents of printed documents into electronic format, and more particularly to the control of electrical power to such devices.

BACKGROUND OF THE INVENTION

Several different types of light sources or lamps have been incorporated into optical scanners in order to illuminate the item being scanned. Among other criteria, the choice of lamp type and style is often based upon cost, size, lamp life, light intensity, output spectrum, power requirements, and turn-on time. Such lamps include cold cathode fluorescent, hot cathode fluorescent, xenon, and light emitting diode (LED) light sources.

In modem scanner systems, especially those using the more popular cold cathode fluorescent lamps, the warm-up time for the scanner's light source is relatively long. For greater productivity, the scanner should be immediately available for use at any time. In a practical sense, the only technique by which this objective can be met is to leave the light source turned on all the time. However, if the light-source is on continuously, excessive power consumption and a large reduction in lamp operational life will result. As an example, cold cathode fluorescent lamps have an average lamp life of between 10,000 and 15,000 hours prior to burn-out. If a cold cathode lamp is on for only 1,000 hours per year, the operational life of the lamp is approximately 10 to 15 years, and even at 2,000 hours per year, it is 5 to 7.5 years. However, if on full time, the operational life of the lamp will be reduced to only 14 to 20 months.

The intensity and spectral balance in the light output from a lamp typically depends on its temperature. Therefore, light output is constantly varying while the lamp is warming up. Without elaborate compensation schemes, the user's first scan can be either of poor quality or can require a noticeable delay before it starts.

Some techniques exist for reducing operator perceived warm-up time for the lightsource, while minimizing degradation in lamp operational life. However, all previous techniques have some disadvantages associated with them. For example, Mustek 1200 IIIEP scanners use a mechanical switch to sense the position of the document lid. Warm-up of the light-source is initiated when the mechanical switch senses that the document lid is no longer closed. The time which the user consumes in document placement and other activities prior to pushing the start button reduces the perceived wait time. Disadvantages of this system are the requirement for a cable connecting the mechanical switch to the electronics controlling the light-source and the reliability of mechanical switches.

Essentially immediate scanning can be accomplished with some combination of the following techniques: (1) use of a stand-by current to keep the lamp near its long term operating temperature when the machine is not in use and (2) use of an instant-on lamp. A disadvantage of the stand-by current system is that significant power is still consumed during long periods of idle time. Also, if the idle current is turned off for some reason, such as after a long period of non-use, the next user will have to wait for the full warm-up to take place. Disadvantages of the instant-on lamp are its relatively high cost and the fact that the spectral output may not match that of the sensitivity of the light-sensor.

Other possible solutions include (1) sensing the light-source output while the page is being scanned and adjusting the power supplied to the lamp in order to hold the lamp output constant and (2) sensing the lamp output while the page is being scanned, and adjusting the sensitivity of the light sensor. A disadvantage of sensing the lamp output while the page is being scanned and adjusting power supplied to the lamp is that the lamp output is limited by initial lamp temperature, so the entire scan must be run at a slower speed, corresponding to the low lamp output at the beginning. This method also requires stability of the spectral output of the lamp, which takes a significant amount of time, as well as a light monitor window with associated additional detection pixels. Sensing the lamp output while the page is being scanned and adjusting the sensitivity of the light sensor has the disadvantage, once again, that the entire scan is run at slow speed, corresponding to the low lamp output at the beginning of the scan. Profile stability and the requirement for a light monitor window with associated additional pixels are issues here also.

Thus, there is a significant need to improve the scanner system so as to reduce, at least, the operator perceived warm-up time for the light-source, while minimizing degradation in lamp operational life. In particular, there is a need for a system to provide power to a scanner lamp that takes only approximately a minute or so to approach its long-term temperature after the operator has completed other activities prior to scanning.

SUMMARY OF THE INVENTION

Representative embodiments of the teachings of the present patent document provide enhanced capabilities not previously available to aid in the reduction of operator perceived lamp warm-up time in optical scanning systems, while minimizing degradation of lamp operational life and controlling energy consumption. These capabilities provide possible increased productivity for an operator of such systems.

Representative embodiments of the present patent document incorporate a light sensor and associated circuitry into a scanner system. When the document lid is raised, ambient room light enters the scanner. The rapid increase in light is detected by the light sensor and used as a trigger to turn on the scanning lamp. While the user arranges his document on the scanner, closes the document lid, enters any setup information into the computer, and any other activities that may be required, the lamp is warming up. By the time that the user finally initiates the scan, the lamp is already well on its way to being warmed up. The user now has to wait less additional time for the lamp to achieve necessary light output and the scan to begin than otherwise would be necessary. The potential for a reduction in operator perceived lamp warm-up time thus exists without requiring that the lamp be on continuously.

Since waiting for the exposure lamp in a scanner system to warm up can be expensive in terms of operator inefficiency, since lamp operational life is reduced in relation to the time the lamp is turned on, and since leaving a lamp on continuously consumes greater energy, representative embodiments of the present invention provide needed, enhanced capabilities not previously available. In addition, lamp warm-up can be initiated without the cost of a mechanical sensor and cable and without imposing constraints on lamp selection or limiting scan speed. Other aspects and advantages of the representative embodiments of the present invention will become apparent from the following detailed description, taken in conjunction with the accompanying drawings, illustrating by way of example the principles of the invention. The details disclosed in the specification should not be read so as to limit the invention.

BRIEF DESCRIPTION OF THE DRAWINGS

The accompanying drawings provide visual representations which will be used to more fully describe the representative embodiments of the present patent document and which can be used by those skilled in the art to better understand it and its inherent advantages. In the drawings, like reference numerals identify corresponding elements and.

DESCRIPTION OF THE PREFERRED EMBODIMENT

Figure 1:
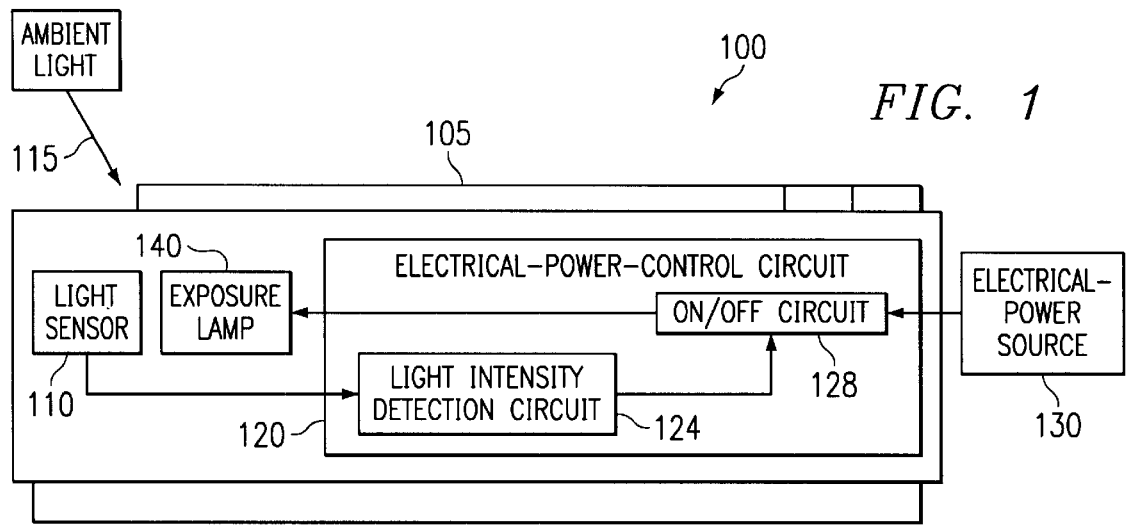
FIG. 1 is a drawing of an image scanner with scanner cover in closed position as described in various representative embodiments of the present patent document.

As shown in the drawings for purposes of illustration, the present patent document relates to a novel apparatus for reducing operator perceived scanner exposure lamp warm-up time while minimizing lamp operational life degradation. Previously an operator would typically either incur excessively long warm-up times or significant reductions in lamp operational life with associated increased energy consumption when using optical scanning machines. Some previous techniques could reduce the perceived warm-up time without leaving the lamp on continuously, but were typically slower in operation or required more complicated or less reliable hardware. In the following detailed description and in the figures of the drawings, like elements are identified with like reference numerals.

FIG. 1 is a drawing of an image scanner 100 with a scanner cover 105 in closed position as described in various representative embodiments of the present patent document. In this representative embodiment, the image scanner 100 comprises the scanner cover 105, a light sensor 110, an electrical-power-control circuit 120, and an exposure lamp 140. The image scanner 100 is also referred to herein as the scanner 100, and the scanner cover 105 is also referred to herein as the cover 105. The electrical-power-control circuit 120 comprises a light intensity detection circuit 124 and an on/off circuit 128. In closed position, the cover 105 is located so as to block substantially all light 115 otherwise incident on the light sensor 110. In open position, the cover 105 is located so as to enable the light sensor 110 to detect incident ambient light 115. In FIG. 1 the scanner cover 105 is closed, and the light sensor 110 will not detect the ambient light 115 of the location in which the scanner 100 is located. The light sensor 110 sends a signal to the light intensity detection circuit 124 indicating the intensity of the ambient light 115 incident upon it. Since the scanner cover 105 is closed in FIG. 1, ambient light 115 is not incident upon the light sensor 110, and the signal sent to the light intensity detection circuit 124 will be below the threshold necessary for the light intensity detection circuit 124 to activate the on/off circuit 128 to connect electrical power from an electrical-power source 130 to the exposure lamp 140.

Figure 2:
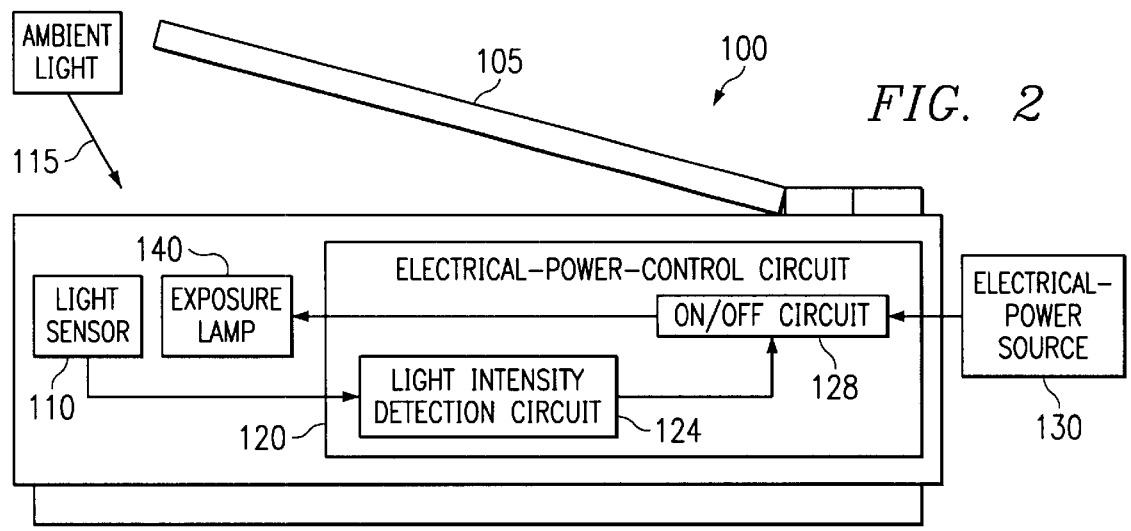
FIG. 2 is a drawing of an image scanner with scanner cover in open position as described in various representative embodiments of the present patent document.

FIG. 2 is a drawing of the image scanner 100 with the scanner cover 105 in open position as described in various representative embodiments of the present patent document. When the scanner cover 105 is opened as shown in FIG. 2, the light sensor 110 detects the ambient light 115 incident upon it from the location in which the scanner 100 is located. The light sensor 110 sends a signal to the light intensity detection circuit 124 in the electrical-power-control circuit 120 indicating that the light sensor 110 is now detecting ambient light 115. When the intensity of light detected by the light sensor 110 is sufficiently great, i.e., above a preselected threshold level, it causes the on/off circuit 128 in the electrical-power-control circuit 120 to connect electrical power from the electrical-power source 130 to the exposure lamp 140. While the user arranges his document on the scanner 100, closes the scanner cover 105, enters any setup information into the scanner computer which is not shown in the figures, and performs any other activities that may be required, the exposure lamp 140 is warming up. By the time that the user finally initiates the scan, the exposure lamp 140 is already well on its way to being warmed up. The user now has to wait less additional time for the exposure lamp 140 to achieve necessary light output and the scan to begin than otherwise would be necessary. The potential for a reduction in operator perceived exposure lamp 140 warm-up time thus exists without requiring that the exposure lamp 140 be on continuously. In a first representative embodiment, electrical power is removed from the exposure lamp 140 whenever the scanner cover 105 is closed and in a second representative embodiment, once electrical power is connected to the exposure lamp 140 by activation of ambient light 115, it remains connected until disconnected by the operator.

Figure 3:
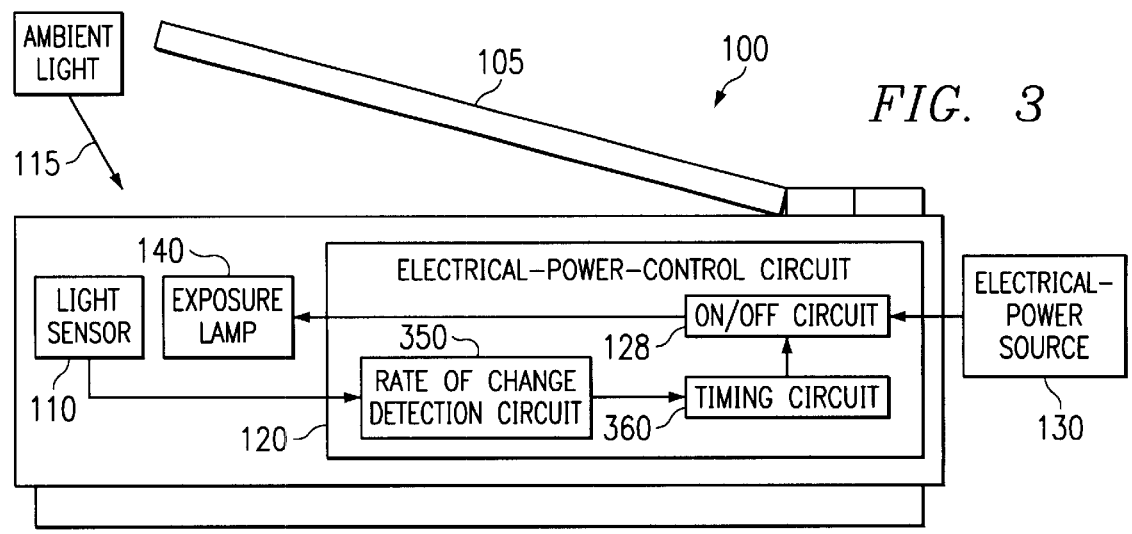
FIG. 3 is a drawing of another image scanner with scanner cover in open position as described in various representative embodiments of the present patent document.

FIG. 3 is a drawing of another image scanner 100 with the scanner cover 105 in open position as described in various representative embodiments of the present patent document. In this representative embodiment which is the preferred embodiment, the image scanner 100 comprises the scanner cover 105, the light sensor 110, the electrical-power-control circuit 120, and the exposure lamp 140. The electrical-power-control circuit 120 in this embodiment comprises a light intensity rate of change detection circuit 350, a timing circuit 360, and the on/off circuit 128. The light intensity rate of change detection circuit 350 is also referred to herein as the rate of change detection circuit 350 and is used to detect the rate at which light 115 incident on the light sensor 110 changes. The timing circuit 360 measures a preselected period of time once activated. The timing circuit 360 turns off or deactivates once the preselected period of time has passed, i.e., when the timing circuit 360 times out. In closed position, the cover 105 is located so as to block substantially all light 115 otherwise incident on the light sensor 110. In open position, the cover 105 is located so as to enable the light sensor 110 to detect incident ambient light 115. FIG. 3 shows the scanner cover 105 having just been opened. With the scanner cover 105 open, the light sensor 110 detects ambient light 115 of the location in which the scanner 100 is located. The light sensor 110 sends a signal to the light intensity rate of change detection circuit 350 indicating the rate of change of the intensity of the ambient light 115 incident upon the light sensor 140.

In the preferred embodiment of FIG. 3, it is the rapid increase in light 115 as detected by the light sensor 110, as for example when the scanner cover 105 is raised, that is used as a trigger by the light intensity rate of change detection circuit 350 to activate the timing circuit 360 which in turn activates the on/off circuit 128 to connect electrical power from the electrical-power source 130 to the exposure lamp 140. The timing circuit 360 activates the on/off circuit 128 to maintain connection of electrical power to the exposure lamp 140 until after a preselected period of time. After the preselected period of time the timing circuit 360 times out and the on/off circuit 128 disconnects electrical power from the electrical-power source 130 to the exposure lamp 140. Thus, if the operator leaves the scanner cover 105 open or closed without reopening for a period of time longer than the preselected period of time, electrical power will be removed from the exposure lamp 140 after that preselected period of time saving both electrical power and lamp life. Thus in the preferred embodiment, it is the rapid increase in light 115 that is detected by the light sensor 110 and used as a trigger to turn on the exposure lamp 140. While the user arranges his document on the scanner 100, closes the scanner cover 105, enters any setup information into the scanner computer which is not shown in the figures, and any other activities that may be required, the exposure lamp 140 is warming up. By the time that the user finally initiates the scan, the exposure lamp 140 is already well on its way to being warmed up. The user now has to wait less additional time for the exposure lamp 140 to achieve necessary light output and the scan to begin than otherwise would be necessary. The potential for a reduction in operator perceived exposure lamp 140 warm-up time thus exists without requiring that the exposure lamp 140 be on continuously. After a period of time previously specified, unless the scanner cover 105 is reopened within that period of time, the timing circuit 360 disconnects electrical power of the electrical-power source 130 from the electrical-power-control circuit.

In a third representative embodiment, the timing circuit 360 is omitted and the light intensity rate of change detection circuit 350 is connected to the on/off circuit 128. Once the rate of change of the ambient light 115 exceeds a preselected threshold value, the light intensity rate of change detection circuit 350 activates the on/off circuit 128 to connect electrical power from the electrical-power source 130 to the exposure lamp 140. Once electrical power is connected to the exposure lamp 140 by activation of the change in ambient light 115, it remains connected until disconnected by the operator in this third representative embodiment.

In any of the embodiments, the exposure lamp 140 could be for example a cold cathode fluorescent lamp, a hot cathode fluorescent lamp, a xenon lamp, or a light emitting diode (LED).

In practical cases, the electrical-power source 130 is the electric power provided by the wall electrical outlet of the building in which the scanner 100 is located.

Embodiments of the present patent document can be used to advantage in image scanners 100 which use any type of exposure lamp 145 having a non-instantaneous turn on time. A cold cathode fluorescent lamp is often used in commercial scanning machines and is an example of the type of exposure lamp 145 which would benefit from the advantages of incorporating a light sensor 110 into the scanner 100, as described herein.

A primary advantage of the embodiments, as described in the present patent document, over previous techniques is the significant reduction in perceived exposure lamp warm-up time while minimizing lamp operational life degradation. Also, energy consumption is significantly less than if the scanner lamp is left on continuously. An added advantage is the fact that the decrease in perceived warm-up time can occur automatically, without additional operator action. Thus, embodiments of the present patent document solve important problems with operator productivity, lamp operational life, and energy consumption in the use of optical scanners.

What is claimed is:

1. An image scanner for scanning an image, comprising:

a light sensor;

a cover having a closed position and an open position, wherein the cover in closed position is located so as to block substantially all light otherwise incident on the light sensor and wherein the cover in open position is located so as to enable the light sensor to detect incident ambient light, wherein source of the incident ambient light is external to the scanner;

an electrical-power-control circuit, comprising a rate of change detection circuit, a timing circuit, and an on/off circuit, wherein the rate of change detection circuit is configured to receive incident light signal from the light sensor and to activate the timing circuit when the rate of change of incident ambient light exceeds a preselected rate; and an exposure lamp, wherein the timing circuit is configured to activate the on/off circuit when the timing circuit is activated and wherein the on/off circuit is configured to provide connection for conduction of electrical power from an electrical-power source to the exposure lamp when the on/off circuit is activated.

2. The image scanner as recited in claim 1, wherein the timing circuit is further configured to time-out after a preselected period of time and wherein the on/off circuit is further configured to remove the connection for conduction of electrical power from the electrical-power source to the exposure lamp when the timing circuit has timed-out.

3. The apparatus as recited in claim 1, wherein the exposure lamp is a light source selected from the group consisting of a cold cathode fluorescent lamp, a hot cathode fluorescent lamp, a xenon lamp, and a light emitting diode (LED).

4. An image scanner for scanning an image, comprising:

a light sensor;

a cover having a closed position and an open position, wherein the cover in closed position is located so as to block substantially all light otherwise incident on the light sensor and wherein the cover in open position is located so as to enable the light sensor to detect incident ambient light, wherein source of the incident ambient light is external to the scanner;

an electrical-power-control circuit, comprising a rate of change detection circuit and an on/off circuit, wherein the rate of change detection circuit is configured to receive incident light signal from the light sensor and to activate the on/off circuit when the rate of change of incident ambient light exceeds a preselected rate; and an exposure lamp, wherein the on/off circuit is configured to provide connection for conduction of electrical power from an electrical-power source to the exposure lamp when the on/off circuit is activated.

5. The apparatus as recited in claim 4, wherein the exposure lamp is a light source selected from the group consisting of a cold cathode fluorescent lamp, a hot cathode fluorescent lamp, a xenon lamp, and a light emitting diode (LED).

6. An image scanner for scanning an image, comprising:

a light sensor;

a cover having a closed position and an open position, wherein the cover in closed position is located so as to block substantially all light otherwise incident on the light sensor and wherein the cover in open position is located so as to enable the light sensor to detect incident ambient light, wherein source of the incident ambient light is external to the scanner;

an electrical-power-control circuit, comprising a light intensity detection circuit and an on/off circuit, wherein the light intensity detection circuit is configured to receive incident light signal from the light sensor and to activate the on/off circuit when intensity of incident ambient light exceeds a preselected value; and an exposure lamp, wherein the on/off circuit is configured to provide connection for conduction of electrical power from an electrical-power source to the exposure lamp when the on/off circuit is activated.

7. The apparatus as recited in claim 6, wherein the exposure lamp is a light source selected from the group consisting of a cold cathode fluorescent lamp, a hot cathode fluorescent lamp, a xenon lamp, and a light emitting diode (LED).

* * * * *